(12) United States Patent
Sato et al.

(10) Patent No.: US 9,575,545 B2
(45) Date of Patent: Feb. 21, 2017

(54) LSI AND INFORMATION PROCESSING SYSTEM

(71) Applicant: Renesas Electronics Corporation, Kanagawa (JP)

(72) Inventors: Yoshio Sato, Kanagawa (JP); Hideaki Hayashi, Tokyo (JP); Takashi Yoshida, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 298 days.

(21) Appl. No.: 14/188,332

(22) Filed: Feb. 24, 2014

(65) Prior Publication Data

US 2014/0245048 A1   Aug. 28, 2014

(30) Foreign Application Priority Data

Feb. 25, 2013   (JP) .................................. 2013-034362

(51) Int. Cl.
*G06F 1/32* (2006.01)
*G06F 9/44* (2006.01)

(52) U.S. Cl.
CPC ........... *G06F 1/3275* (2013.01); *G06F 1/3237* (2013.01); *G06F 1/3287* (2013.01); *G06F 9/44* (2013.01); *Y02B 60/1221* (2013.01); *Y02B 60/1228* (2013.01); *Y02B 60/1282* (2013.01); *Y02B 60/32* (2013.01)

(58) Field of Classification Search
CPC ................ G06F 1/32; G06F 1/26; G06F 1/28; G06F 1/00; G06F 9/44
USPC ........ 713/300, 310, 320, 321, 322, 323, 324, 713/330, 345, 375
See application file for complete search history.

(56) References Cited

U.S. PATENT DOCUMENTS

| 5,784,611 A * | 7/1998 | Thantrakul | G06F 9/4403 713/1 |
| 7,272,737 B2 * | 9/2007 | Oteki | G03G 15/5004 713/320 |
| 8,909,965 B2 | 12/2014 | Saito | |
| 2005/0283572 A1 * | 12/2005 | Ishihara | G06F 1/3203 711/118 |
| 2006/0274591 A1 * | 12/2006 | Fujioka | G11C 7/1045 365/222 |
| 2014/0032956 A1 * | 1/2014 | De Caro | G06F 1/3275 713/324 |

FOREIGN PATENT DOCUMENTS

| JP | 2010-55419 A | 3/2010 |
| JP | 2012-221442 A | 11/2012 |

OTHER PUBLICATIONS

Japanese Office Action dated Jul. 28, 2016 issued in Japanese Patent Application No. 2013-034362 (English translation).

* cited by examiner

*Primary Examiner* — Jaweed A Abbaszadeh
*Assistant Examiner* — Keshab Pandey
(74) *Attorney, Agent, or Firm* — McDermott Will & Emery LLP (57) ABSTRACT

The controller LSI is connected to an SPI flash memory having a deep power down mode (DPM), and brings the SPI flash memory to the DPM and then brings itself to low power consumption mode (LPM) that volatilizes data in a RAM. This invention solves the problem that the controller LSI cannot release the peripheral device from the DPM upon returning from the LPM due to the volatilization of the data. The controller LSI includes a CPU, the RAM, and an SPI control unit transmitting an SPI command to the flash memory. The SPI command includes a power down command to bring the flash memory into DPM and a release command to release it from the DPM. Upon returning from the LPM, the controller LSI causes the control unit to transmit a release command to the flash memory irrespective of whether it is in DPM or normal mode.

17 Claims, 6 Drawing Sheets

LSI AND INFORMATION PROCESSING SYSTEM

CROSS-REFERENCE TO RELATED APPLICATIONS

The disclosure of Japanese Patent Application No. 2013-34362 filed on Feb. 25, 2013 including the specification, drawings and abstract is incorporated herein by reference in its entirety.

BACKGROUND

The present invention relates to controller LSIs (Large Scale Integrated circuits) controlling peripheral devices having a power down mode and information processing systems equipped with the controller LSIs, and more particularly to a controller LSI capable of putting itself into low power consumption mode and being suitably applicable to an information processing system.

With recent society-wide efforts to improve energy efficiency, ensuring low power consumption of semiconductor systems is almost an indispensable requirement. There are an increasing number of products provided with a low power consumption mode; the products include not only microcomputers with a CPU (Central Processing Unit), but also external peripheral devices, such as RAMs (Random Access Memories) and ROMs (Read Only Memories). As to external ROMs, migration from generally-used simultaneously-accessible parallel NOR-flash memories (registered trademark) (NOR-Flash) to SPI NOR-Flash memories that can perform the equivalent functions to those of the generally-used NOR flash memories with fewer pins is underway. In order to perform the equivalent functions with fewer pins, the SPI NOR-Flash is designed to gain access, on a command base, through a communication channel of SPI (Serial Peripheral Interface) communication, which is one of the communication modes among on-board ICs (Integrated Circuits). Recent devices have a low power consumption mode function, so-called deep power down (DPD) mode (DPM) that is also executable on a command base. In response to a deep power down command (DP command), the devices enter deep power down mode, while returning from the deep power down mode to normal mode in response to a RES (REleaSe from Deep Power Down) command. LSI is increasingly required to implement a function for manipulating the low power consumption mode function as a controller.

Japanese Unexamined Patent Publication No. 2010-55419 discloses a technology of reducing power consumption of a NOR flash memory. The NOR flash memory has a DPD function that brings the NOR flash memory into deep power down mode to reduce power consumption and enters and returns from the DPD state in response to a DPD signal supplied from a memory control unit connected thereto. The memory control unit brings the NOR flash memory into a DPD state when the memory control unit does not receive a request to access the NOR flash memory within a predetermined period of time.

SUMMARY

The inventors of the present invention studied Japanese Unexamined Patent Publication No. 2010-55419 and found the following new problems therein.

Not only peripheral devices, which are controlled devices like the aforementioned NOR flash memory, but also various types of controller LSIs, which are controlling devices over the peripheral devices like microcomputers, need to have low power consumption modes of equal level. There are various levels of low power consumption modes. For example, some low power consumption modes are implemented by lowering power supply voltage, by lowering the frequency of operation clocks or stopping the operation clocks, by suspending power supply to some unnecessary function blocks, or the like. An especially effective mode of maintaining low power consumption is deep power down mode in which power supply to as many components as possible is suspended. For instance, some controller LSIs, which are microcomputers each including a CPU and a RAM built therein and are designed to operate the CPU with programs loaded from an external ROM to the RAM, enter deep power down mode to suspend power supply to the CPU and RAM. The transition of the controller LSIs to the low power consumption mode where power supply to the RAM is shut off volatilizes the programs loaded to the RAM and intermediate data held in the RAM.

In a case where the aforementioned controller LSI is used to control the NOR flash memory or other types of peripheral devices having a deep power down mode, and especially a case where the controller LSI and the peripheral devices are designed to be controlled only on a command base, the following problem may occur. The controller LSI transmits a power down command (DP command) to a peripheral device having a deep power down mode to bring it into the deep power down mode. To release the peripheral device from the deep power down mode, the controller LSI issues a release command (RES command) to the peripheral device. The controller LSI stores information that the peripheral device has made the transition to deep power down mode, as a state or intermediate data, and issues a release command (RES command) to the peripheral device when needing to release the peripheral device. Because of this, the controller LSI cannot make the transition to low power consumption mode (e.g., deep power down mode), which may volatilize the contents stored in the internal volatile memory, between the time after the controller LSI has brought the peripheral device into the deep power down mode and until it has released the peripheral device from the deep power down mode. Given that the controller LSI enters low power consumption mode causing volatilization of the contents stored in the internal volatile memory after having the peripheral device enter deep power down mode, the information (state and intermediate data) about the transition of the peripheral device to the deep power down mode also volatilizes, and therefore the controller LSI cannot issue a release command (RES command) when the peripheral device needs to be released from the deep power down mode.

The following are measures for solving the aforementioned problem. The other problems and novel features of the present invention will become apparent from the following description in the present specification and the accompanying drawings.

An embodiment according to the present invention will be shown below.

The embodiment is directed to a controller LSI connectable to a peripheral device that enters power down mode in response to a power down command and returns from the power down mode to normal mode in response to a release command, and the controller LSI is configured as below. The controller LSI includes a CPU, a volatile memory accessible from the CPU, and a control unit that transmits commands including a power down command and a release command to the peripheral device. The controller LSI has a plurality of operation modes including a low power consumption mode in which data stored in the volatile memory is volatilized. Upon returning from the low power consumption mode, the controller LSI causes the control unit to transmit a release command irrespective of whether the peripheral device is in power down mode or in normal mode.

Effects produced by the embodiment will be briefly described below.

The embodiment can solve the problem that the controller LSI returned from the low power consumption mode cannot release the peripheral device from the power down mode due to volatilization of data stored in the volatile memory caused by the transition of the controller LSI to the low power consumption mode after having the peripheral device enter the power down mode.

DETAILED DESCRIPTION

1. General Outline of Embodiments

To begin with, representative embodiments of the present invention disclosed herein are outlined. In the following general description of the representative embodiments, reference designators (numerals) in the drawings, which are given for referential purposes in parentheses, are only illustrative of elements that fall within the concepts of the components identified by the designators.

[1] <Transmission of RES Command at the Time of Return from Low Power Consumption Mode>

The LSI (1) according to a representative embodiment is configured as follows.

The LSI is connectable to a peripheral device (10). The peripheral device enters power down mode (DPM) in response to a power down command (DP command), while returning from the power down mode to normal mode in response to a release command (RES command). When the peripheral device is in the power down mode, any commands other than the release command cannot release the peripheral device from the power down state.

The LSI includes a CPU (7), a volatile memory (RAM) (3) accessible from the CPU, and a control unit (2) that transmits commands including a power down command and a release command to the peripheral device. In addition, the LSI has a plurality of operation modes including a low power consumption mode that volatilizes data stored in the volatile memory. The LSI is configured to cause the control unit to transmit a release command to the peripheral device when the LSI has returned from the low power consumption mode.

This configuration can prevent the problem that the peripheral device cannot be released from the power down mode even after the LSI returns from the low power consumption mode because the transition of the LSI to the low power consumption mode after having moved the peripheral device to the power down mode volatilizes data stored in the volatile memory.

[2] <Transmission of RES Command at the Top of Boot Sequence>

In the section under [1], the LSI further includes a boot controller (15) that can execute a boot sequence. With execution of the boot sequence by the boot controller, a program executable by the CPU is loaded from the peripheral device to the volatile memory. The boot sequence is configured to cause the control unit to transmit the release command to the peripheral device (step 35) before the program is loaded.

This configuration can prevent the problem that the peripheral device cannot be released from the power down mode even after the LSI returns from the low power consumption mode because the transition of the LSI to the low power consumption mode volatilizes the program stored in the volatile memory to be executed by the CPU of the LSI. Therefore, the program for the CPU is properly loaded to the volatile memory again.

[3] <SPI NOR-Flash ROM>

In the section under [2], the peripheral device is a flash memory (10_1) having a deep power down mode (DPM), and the LSI includes a serial communication terminal (24) that is in conformity with SPI communication standards and is used to transmit the commands including the power down command and the release command from the control unit to the peripheral device.

Even if the peripheral device is a flash memory (SPI NOR-flash ROM) accessible through serial communication in conformity with the SPI communication standards, the LSI can properly release the peripheral device from the deep power down mode (DPM).

[4] <Selection of Whether to Support or not Support Release with Issue of RES Command>

In the section under [2], the LSI is configured to be able to select whether to cause the control unit to transmit the release command to the peripheral device before loading the program or to load the program without transmission of the release command in the boot sequence (step 33).

This configuration can shorten the time required for the peripheral device to be released when the LSI does not need to support the release with the issue of a release command (RES command).

[5] <Issue of Regular Command after Predetermined Waiting Time Subsequent to RES Command Transmission>

In any one section from [1] to [4], after the LSI returns from the low power consumption mode and then causes the control unit to transmit a release command to the peripheral device, the LSI waits for a predetermined period of time (step 36) prior to starting the issue of regular commands other than the release command.

Even if the peripheral device takes some time to be released from the power down mode, the LSI can wait for that time so as to allow the peripheral device to properly operate after being released from the power down mode. In the case of the flash memory described in the section under [2] or [3], the flash memory can properly initiate the boot sequence.

[6] <Issue of Regular Command after a Plurality of RES Command Transmissions>

In any one section from [1] to [4], after the LSI returns from the low power consumption mode and then causes the control unit to transmit a release command to the peripheral device more than once, the LSI starts issuing regular commands other than the release command.

Even if the peripheral device takes some time to be released from the power down mode, the LSI can wait for that time so as to allow the peripheral device to properly operate after being released from the power down mode. In the case of the flash memory described in the section under [2] or [3], the LSI can properly initiate the boot sequence.

[7] <Terminal for Specifying the Number of Issues of RES Command at the Time of Release>

In the section under [6], the LSI includes a terminal (26) that can specify the number of issues of the release command to be transmitted from the control unit to the peripheral device when the LSI returns from the low power consumption mode.

Even if the time required for the peripheral device to be released from the power down mode varies according to the types and specifications of the peripheral device, the LSI can adjust the time appropriately to match the releasing time and waiting time and the setting can be implemented by fixing the voltage for the terminal.

[8] <Issue of Regular Command after Waiting for Predetermined Response from External Peripheral Device to RES Command Transmission>

In any one section from [1] to [4], the LSI returns from the low power consumption mode and then causes the control unit to transmit a release command to the peripheral device. Subsequently, the LSI issues a read command that is a request to read predetermined data from the peripheral device and waits until the response to the read command matches a predetermined expectation value, and then starts issuing regular commands other than the release command.

Even if the time required for the peripheral device to be released from the power down mode varies according to the types and specifications of the peripheral device, the waiting time for release is automatically adjusted to an appropriate length of time.

[9] <Predetermined Test Pattern in SPI NOR-Flash ROM>

In the section under [8], the peripheral device is a flash memory (10_1) having a deep power down mode (DPM), and the flash memory stores predetermined test pattern data at a predetermined address.

The read command is a command to read data at the address, and the LSI waits until the response to the read command matches the test pattern and then starts issuing regular commands other than the release command.

Even if the peripheral device is a flash memory having a deep power down mode and the time required for the peripheral device to be released from the deep power down mode varies according to the types and specifications of the peripheral device, the LSI can properly release the peripheral device from the deep power down mode. Especially, even if the time required for the peripheral device to be released from the deep power down mode is not clear or unstable, the LSI can resume regular operations after verifying that the peripheral device has been definitely released from the deep power down mode.

[10] <Configurable Command Code of RES Command>

In any one section from [1] to [4], the LSI can change a command code assigned to the release command.

Even if the command code assigned to the release command for the peripheral device is not a specific code, the LSI can appropriately change the command code to obtain an adaptable code. In the case of the flash memory described in the section under [2] or [3], for example, the command code conventionally used for the RES command is AB in hexadecimal notation. Even if the hexadecimal digits are changed, the LSI can obtain an adaptable code by appropriately changing the digits.

[11] <Register Configuring Command Code of RES Command>

In the section under [10], the LSI includes an externally-rewritable register (18) that can hold the command code.

Even if the command code assigned to the release command for the peripheral device is not a specific code, the LSI can freely change the command code to obtain an adaptable code. In the case of the flash memory described in the section under [2] or [3], for example, the command code conventionally used for the RES command is AB in hexadecimal notation. Even if the hexadecimal digits are changed, the LSI can obtain an adaptable code by freely changing the digits.

[12] <Information Processing System: Transmission of RES Command at the Time of Return from Low Power Consumption Mode>

An information processing system includes a peripheral device (10) and an LSI (1) and is configured as follows.

A peripheral device enters power down mode (DPM) in response to a power down command (DP command), while returning from the power down mode to normal mode in response to a release command (RES command). When the peripheral device is in the power down mode, any commands other than the release command cannot release the peripheral device from the power down state.

The LSI connected to the peripheral device includes a CPU (7), a volatile memory (RAM) (3) accessible from the CPU, and a control unit (2) that transmits commands including a power down command and a release command to the peripheral device.

The LSI has a plurality of operation modes including a low power consumption mode in which data stored in the volatile memory volatilizes and can cause the control unit to transmit the release command to the peripheral device when the LSI has returned from the low power consumption mode.

This configuration can prevent the problem that the peripheral device cannot be released from the power down mode even after the LSI returns from the low power consumption mode because the transition of the LSI to the low power consumption mode after having moved the peripheral device to the power down mode volatilizes data stored in the volatile memory.

[13] <Transmission of RES Command at the Top of Boot Sequence>

In the section under [12], the peripheral device stores a program to be executed by the CPU. The LSI further includes a boot controller (15) that can execute a boot sequence. With the execution of the boot sequence by the boot controller, the program executable by the CPU is loaded from the peripheral device to the volatile memory. The boot sequence is configured to cause the control unit to transmit the release command to the peripheral device (step 35) before the program is loaded.

This configuration can prevent the problem that the peripheral device cannot be released from the power down mode even after the LSI returns from the low power consumption mode because the transition of the LSI to the low power consumption mode volatilizes the program stored in the volatile memory to be executed by the CPU of the LSI. Therefore, the program for the CPU is properly loaded to the volatile memory again.

[14] <SPI NOR-Flash ROM>

In the section under [13], the peripheral device is a flash memory (10_1) having a deep power down mode (DPM), and the peripheral device and the LSI are interconnected with a serial communication channel (9) in conformity with SPI communication standards.

Even if the peripheral device is a flash memory accessible through serial communication in conformity with the SPI communication standards, the LSI can properly release the peripheral device from the deep power down mode.

[15] <Predetermined Test Pattern in SPI NOR-Flash ROM>

In the section under [14], the flash memory stores a predetermined test pattern data at a predetermined address.

After the control unit transmits the release command to the peripheral device when the LSI returns from the low power consumption mode, the LSI issues a read command that is a request to read data at the address of the peripheral device, and the LSI waits until the response to the read command matches the test pattern and then starts issuing regular commands other than the release command.

Even if the time required for the peripheral device to be released from the power down mode varies according to the types and specifications of the peripheral device, the waiting time for release is automatically adjusted to an appropriate length of time. Especially, even if the peripheral device is a flash memory having the deep power down mode and the time required for the peripheral device to be released from the deep power down mode varies according to the types and specifications of the peripheral device, the LSI can properly release the peripheral device from the deep power down mode. Even if the time required for the peripheral device to be released from the deep power down mode is not clear or unstable, the LSI can resume regular operations after verifying that the peripheral device has been definitely released from the deep power down mode.

[16] <Configurable Command Code of RES Command>

In anyone section from [12] to [14], the LSI can change a command code assigned to the release command.

Even if the command code assigned to the release command for the peripheral device is not a specific code, the LSI can appropriately change the command code to obtain an adaptable code. In the case of the flash memory described in the section under [2] or [3], for example, the command code conventionally used for the RES command is AB in hexadecimal notation. Even if the hexadecimal digits are changed, the LSI can obtain an adaptable code by appropriately changing the digits.

[17] <MCU Releasing LSI from Low Power Consumption Mode>

In the section under [16], the information processing system further includes an MCU (20).

The LSI includes an externally-rewritable release-command-code configuring register (18) that can hold the command code.

The MCU is configured to supply interrupt signals (Irq; 22) to release the LSI from the low power consumption mode, and the release-command-code configuring register is configured to be rewritable.

Accordingly, the MCU (20) can perform release control on the LSI in low power consumption mode to release the LSI from the mode. Even if the command code assigned to the release command is not a specific code, the LSI can freely change the command code to obtain an adaptable code. In the case of the flash memory described in the section under [2], [3] or [14], for example, the command code conventionally used for the release command (RES command) is AB in hexadecimal notation. Even if the hexadecimal digits are changed, the LSI can obtain an adaptable code by freely changing the digits.

2. Detailed Descriptions of Embodiments

Embodiments will be further described in detail.

First Embodiment

<Transmission of RES Command at the time of Return from Low Power Consumption Mode>

Figure 1:
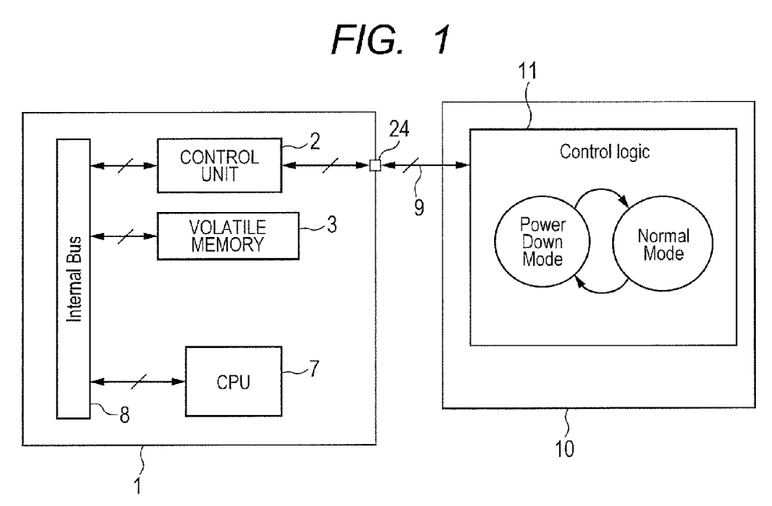
FIG. 1 is a block diagram showing the configuration of an LSI according to the first embodiment.

FIG. 1 is a block diagram showing the configuration of an LSI 1 according to the first embodiment.

The LSI 1 is connectable to a peripheral device 10. The LSI 1, although not restrictive, is formed on a single silicon substrate by a well-known CMOS (Complementary Metal-Oxide-Semiconductor field effect transistor) LSI fabrication technology. A peripheral device 10 has at least two operation modes, power down mode (DPM) and normal mode (Normal Mode), and makes transition between the two operation modes depending on a power down command (DP command) and release command (RES command) received. When the peripheral device 10 in normal mode receives a power down command (DP command), the peripheral device 10 enters power down mode (DPM), while returning from the power down mode to normal mode upon receiving a release command (RES command). When the operation mode of the peripheral device 10 is power down mode, any commands other than the release command cannot move the peripheral device 10 out of the power down mode. Although not restrictive, the peripheral device 10 may include a control logic 11 equipped with a finite state machine (FSM) that controls the transition between the operation modes.

The LSI 1 includes a CPU 7, a volatile memory 3 accessible from the CPU 7, and a control unit 2 that transmits commands including a power down command (DP command) and a release command (RES command) to the peripheral device 10. In addition, the LSI 1 has a plurality of operation modes including a low power consumption mode where data stored in the volatile memory 3 volatilizes. When returning from the low power consumption mode, the LSI 1 causes the control unit 2 to transmit a release command (RES command) to the peripheral device 10. The LSI 1 is configured to transmit a release command (RES command) irrespective of whether the LSI 1 transmitted a power down command (DP command) to the peripheral device 10 before transition to the low power consumption mode, or, in other words, irrespective of whether the peripheral device 10 is in the power down mode (DPM) or in the normal mode when the LSI 1 has returned from the low power consumption mode. This configuration allows the peripheral device 10 in the power down mode (DPM) to return to the normal mode to initiate regular operations, therefore preventing the occurrence of the problem that the peripheral device 10 cannot return from the power down mode. On the other hand, even if the peripheral device 10 in the normal mode receives a release command (RES command), no particular operational failure occurs.

Second Embodiment

<Controller LSI for SPI NOR-Flash ROM>

The second embodiment described below adopts a flash memory 10_1, as an example of the peripheral device 10, that has a deep power down mode (DPM) and may be an SPI NOR-Flash or the like.

Figure 2:
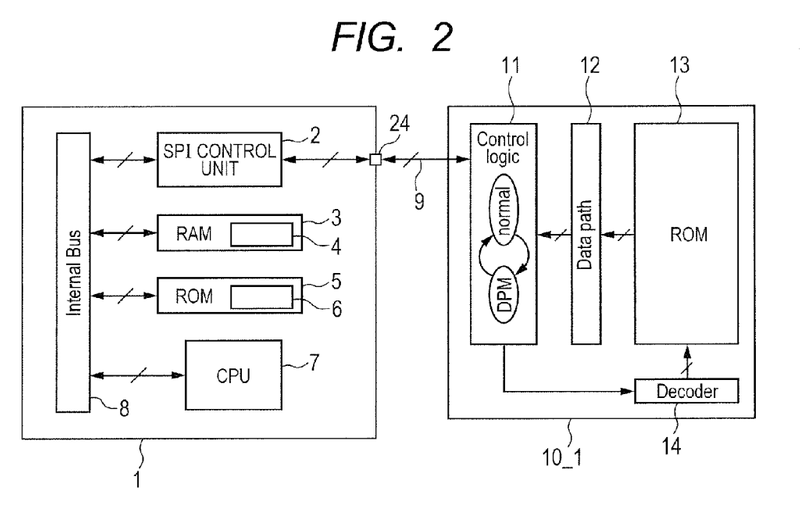
FIG. 2 is a block diagram showing the configuration of a controller LSI according to the second embodiment.

FIG. 2 is a block diagram showing the configuration of a controller LSI according to the second embodiment.

In the second embodiment, the peripheral device 10 is a flash memory 10_1 having a deep power down mode (DPM), while the LSI 1 is a controller LSI 1 for the peripheral device. The controller LSI 1 includes an SPI control unit 2 serving as a control unit, a RAM 3 serving as a volatile memory, a ROM 5, and a CPU 7, and these components are connected one another with an internal bus 8. The controller LSI 1 includes a serial communication terminal 24 that is used to transmit commands to the flash memory 10_1 and is in conformity with SPI communication standards. A communication line 9 includes, for example, a clock, a chip select, and a 1-bit or 4-bit clock synchronous (three-wire method) serial signal line. The RAM 3 stores a program 4 to be executed by the CPU 7, and the ROM 5 stores a boot program 6 used to import the program 4 into the RAM 3 from the outside.

The flash memory 10_1, such as an SPI NOR-Flash, includes an electrically rewritable ROM mat 13 (simply referred to as "ROM" in FIG. 2), a decoder 14 that drives a word line of the ROM mat 13, a data path 12 through which signals read out from the ROM mat 13 pass, and a control logic unit 11. The control logic unit 11 including an interface circuit connected to the communication line 9 translates access requests on a command base and executes the requests. For example, when a read command attached with an address is input in series through the communication line 9, the control logic unit 11 feeds the input address to the decoder 14 and receives data read out from the ROM mat 13 via the data path 12 to send it out to the communication line 9 in a serial SPI communication packet. Deep power down commands (DP command) and release commands (RES command) are also input in series via the same communication line 9. The control logic unit 11 includes, although not restrictive, for example, a finite state machine (FSM), and is configured to make operating mode transition between deep power down mode (DPM) and normal mode. When the control logic unit 11 in normal mode receives a deep power down command (DP command), the control logic unit 11 enters deep power down mode (DPM), while returning to the normal mode when the control logic unit in the deep power down mode receives a release command (RES command). When the operation mode of the control logic unit 11 is deep power down mode, any commands other than the release command (RES command) cannot move the control logic unit 11 out of the deep power down mode. The release command (RES command) is essential to release the flash memory 10_1, such as a SPI NOR-Flash, from the deep power down mode. Suppose that the flash memory 10_1, like an SPI NOR-Flash, is equipped with a reset terminal or a DPD terminal as described in Japanese Unexamined Patent Publication No. 2010-55419, it is possible to control the mode transition by controlling the terminals rather than the release command (RES command); however, the tendency of reducing the number of pins puts the SPI NOR-Flash without the reset terminal, let alone the DPD terminal, in the mainstream.

After the power source is turned on or reset, the controller LSI 1 runs the boot program 6 stored in the ROM 5 to readout the program 4 from the flash memory 10_1 and to transfer the program 4 to the RAM 3, and then executes the program 4. The program 4 contains steps of transmitting deep power down commands (DP commands) to bring the flash memory 10_1 into deep power down mode (DPM). The program 4 also contains steps of transmitting release commands (RES commands) to release the flash memory 10_1 from the deep power down mode (DPM) to normal mode. The controller LSI 1 can freely and properly control the operational state of the flash memory 10_1 as long as the CPU 7 keeps running the program 4.

However, the controller LSI 1 is also strongly required to ensure low power consumption. To achieve low power consumption, the controller LSI 1 also has a low power consumption mode (deep power down mode) where power supply to the RAM 3 and other components is suspended. If the controller LSI 1 itself makes transition to the low power consumption mode after bringing the flash memory 10_1 into deep power down mode (DPM) and before transmitting a release command (RES command), the program 4 stored in the RAM 3 is volatilized and lost. Simultaneously, state information about if the flash memory 10_1 has entered the deep power down mode (DPM) by the program 4 or if the flash memory 10_1 is in normal mode is also volatilized and lost. Because of this, even if the controller LSI 1 having returned from the low power consumption mode executes the boot program 6 to access the flash memory 10_1 and import the program 4 into the RAM 3, the flash memory 10_1 in the deep power down mode (DPM) may not accept the commands. This situation develops into kind of a deadlock.

To avoid the deadlock, the boot program 6 in the second embodiment includes a step of transmitting a release command (RES command) to the flash memory 10_1 before the step of executing the read command to read data from the flash memory 10_1, irrespective of whether the flash memory 10_1 is in the deep power down mode (DPM) or in the normal mode. This step can brings the flash memory 10_1 in the deep power down mode (DPM) into normal mode to initiate loading the program 4 to the RAM 3. This configuration can solve the problem in which the flash memory 10_1 cannot be released from the deep power down mode. On the other hand, even if the flash memory 10_1 in the normal mode receives a release command (RES command), no particular operational failure occurs.

Thus, even in a case where the peripheral device is a flash memory (SPI NOR-flash ROM) accessible through serial communication in conformity with SPI communication standards, the peripheral device can be properly released from the deep power down mode (DPM).

Third Embodiment

<Selection of Whether to Support or not Support Release with Issue of RES Command>

Figure 3:
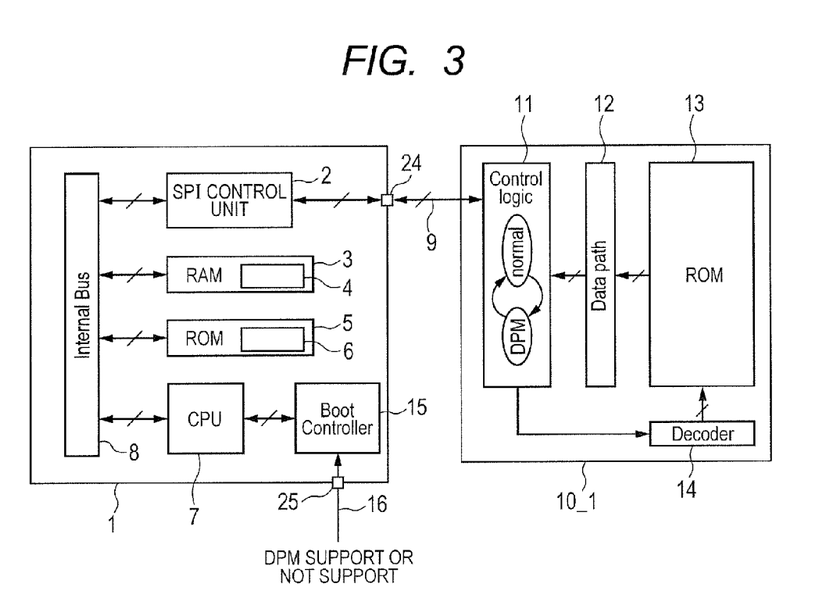
FIG. 3 is a block diagram showing the configuration of a controller LSI according to the third embodiment.

FIG. 3 is a block diagram showing the configuration of a controller LSI according to the third embodiment. In comparison with FIG. 2, the flash memory 10_1 includes the same components, but the controller LSI 1 further includes a boot controller 15. With the boot controller 15, the controller LSI 1 can select, in a boot sequence, whether to cause the SPI control unit 2 to transmit a release command (RES command) before loading the program 4 or to load the program 4 without transmission of the release command (RES command). For example, the controller LSI 1 is provided with a DPM support/non-support specification terminal 25 and is controlled by a signal 16 that is input through the terminal 25 from the outside and specifies whether to provide DMP support or not. The configuration and action of the other elements are the same as those described in the second embodiment already shown in FIG. 2, and therefore their explanations are omitted.

Detailed descriptions about the boot sequence will be made.

Figure 4:
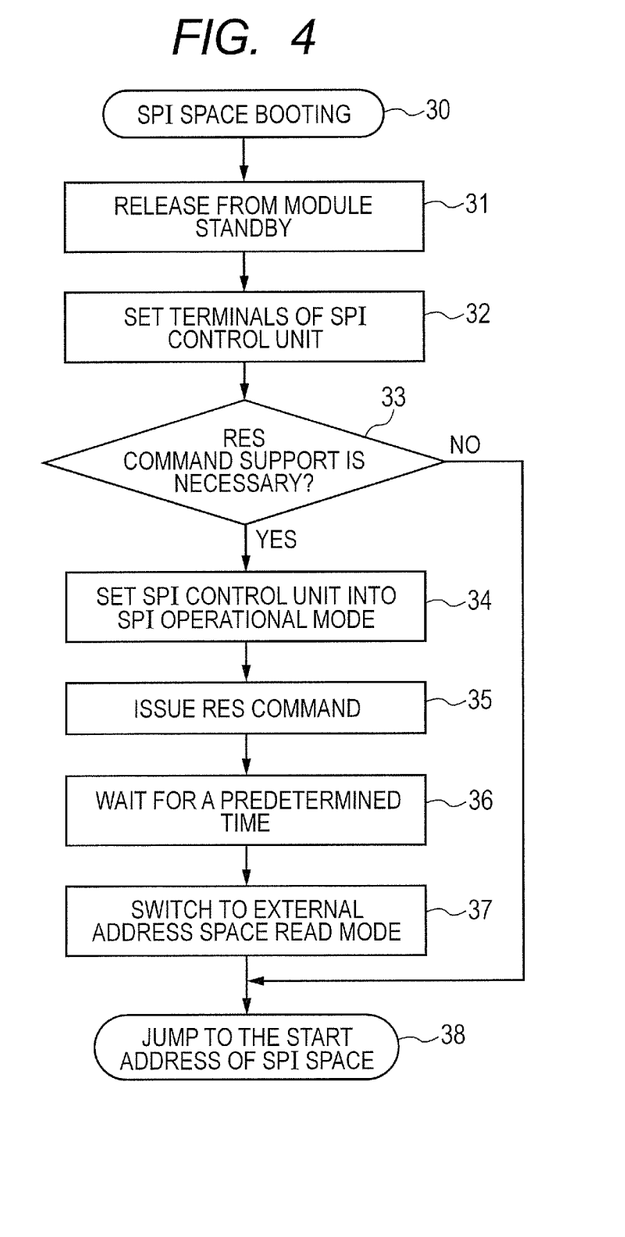
FIG. 4 is a flowchart showing operations of the controller LSI according to the third embodiment.

FIG. 4 is a flowchart showing exemplary operations of the controller LSI according to the third embodiment.

The boot sequence is to execute a boot program 6 stored in the ROM 5 by the CPU 7. At the time of power-on reset or when the controller LSI 1 returns from low power consumption mode like deep power down mode to normal mode, the program 4 is loaded from the external flash memory 10_1 to the RAM 3 via the SPI communication channel 9. This is called SPI space booting. Upon the start of the SPI space booting (step 30), the controller LSI 1 firstly releases the SPI control unit 2 from the module standby state (step 31), and performs setting of the terminals of the SPI control unit 2 (step 32). To reduce power consumption, the controller LSI 1 adopts measures of, for example, stopping clock supply or power supply to unused functional modules. If the SPI control unit 2 is in a module standby state, the SPI control unit 2 needs to be released from the state to initiate SPI communication. If the entire controller LSI 1 is in a low power consumption mode like deep power down mode, the entire controller LSI 1 is released to normal mode in step 31. Then, the controller LSI 1 determines whether RES command support, that is, DPM support is necessary or not (step 33). The controller LSI 1 can determine this by reading the status of a signal 16 specifying the necessity/non-necessity of DPM support if the signal 16 is input through the DPM support/non-support specification terminal 25 from the outside. If the RES command support is not necessary, the controller LSI 1 directly jumps to the start address of the SPI space (step 38) and starts loading the program 4 to the RAM 3. On the other hand, if the signal 16 specifies the "necessity" of the RES command support, the controller LSI 1 sets the SPI control unit 2 to SPI operation mode (step 34) to issue a release command (RES command) (step 35). Irrespective of the operation mode of the external flash memory 10_1, the release command (RES command) is issued. After the issue of the RES command, the controller LSI 1 executes WAIT for a predetermined period of time (step 36). The waiting time is determined based on the time period taken from when the connected flash memory 10_1 has received the RES command and then entered normal mode to when the flash memory 10_1 becomes ready to receive regular SPI commands. Then, the controller LSI 1 is switched to external address space read mode (step 37) and jumps to the start address of the SPI space (step 38) to start loading the program 4 to the RAM 3.

Even if it takes time for the peripheral device 10 to be released from the power down mode, the controller LSI 1 can wait for that time so as to allow the peripheral device 10 to properly operate after release from the power down mode. When, for example, the peripheral device is the flash memory 10_1, the controller LSI 1 can properly initiate the boot sequence. This configuration can shorten the time required for the release operation when the controller LSI 1 does not need to support the release with the issue of a release command (RES command). Especially when the RES command support is not necessary, the controller LSI 1 can be dispensed with unnecessary waiting time in step 36.

Fourth Embodiment
<Specification of the Number of Issues of RES Command at the Time of Release>

Figure 5:
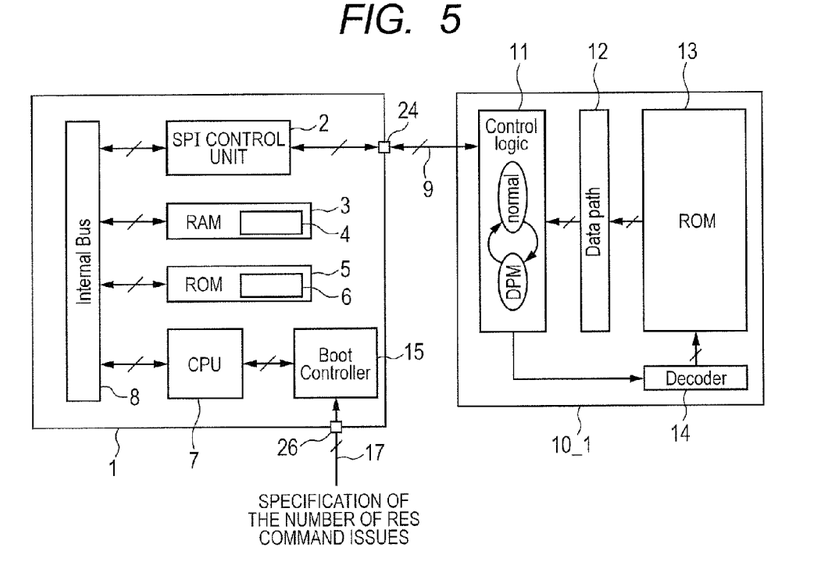
FIG. 5 is a block diagram showing the configuration of a controller LSI according to the fourth embodiment.

FIG. 5 is a block diagram showing the configuration of a controller LSI according to the fourth embodiment. In comparison with FIG. 3, the flash memory 10_1 includes the same components, but the controller LSI 1 is configured to transmit a release command (RES commands) from the SPI control unit 2 a plurality of times when the controller LSI 1 returns from the low power consumption mode and then to start issuing regular commands other than the release command. Although the controller LSI 1 shown in FIG. 3 includes a DPM support/non-support specification terminal 25 and is configured to be controlled by a signal 16 that is input through the terminal 25 and specifies whether to provide DMP support or not, the controller LSI 1 shown in FIG. 5 includes a RES command issue specification terminal 26 and is configured to be controlled by a signal 17 that is input through the terminal 26 and specifies the number of issues of the RES command. The configuration and action of the other elements are the same as those described in the second embodiment already shown in FIG. 3, and therefore their explanations are omitted.

In the boot sequence shown in FIG. 4, the controller LSI 1 reads the number of issues of the RES command specified by the signal 17, instead of determining in step 33, and the issue of the RES command is repeated the specified number of times (step 35). Issue of the RES command (step 35) and execution of WAIT for a predetermined time (step 36) can be alternately repeated. Repeatedly issuing the RES command allows the controller LSI 1 to wait even if the flash memory 10_1 takes time to be released from the deep power down mode, as with the case of execution of WAIT for a predetermined time (step 36), and causes the flash memory 10_1 to properly operate after release from the deep power down mode, thereby properly initiating the boot sequence.

This embodiment illustrates an example in which the number of issues of the RES command is specified through the terminal 26. Even if the time required for the flash memory 10_1 to be released from the deep power down mode varies according to the types and specifications of the flash memory 10_1, the controller LSI 1 can adjust the time appropriately to match the releasing time and waiting time and the setting can be implemented by fixing the voltage for the terminal.

Not only the number of issues of the RES command, but also the length of the predetermined waiting time in step 36 may be set by any methods. For example, the controller LSI 1 can include a register for storing parameters of the number of issues and the length of waiting time and can be connected to another external microcomputer. The number of issues of the RES command and the length of the predetermined waiting time in step 36 can be specified by setting the parameters to the register by the microcomputer. Alternatively, an electrically-rewritable nonvolatile memory may be provided to the controller LSI 1 to store the parameters. Alternatively, trimming by a fuse element may be also available.

Fifth Embodiment
<Waiting for Predetermined Response from External Peripheral Device to RES Command Transmission>

The third and fourth embodiments have described the techniques to specify the parameters to match with the time required for the connected flash memory 10_1 to be released from the deep power down mode. However, these techniques have a problem in that the applicable parameter range needs to be wide to a certain degree. If the parameters exceed the parameter range determined at the design of the controller LSI 1, it may be impossible to match the releasing time and waiting time. The fifth embodiment presents an exemplary solution to the novel problem.

Figure 6:
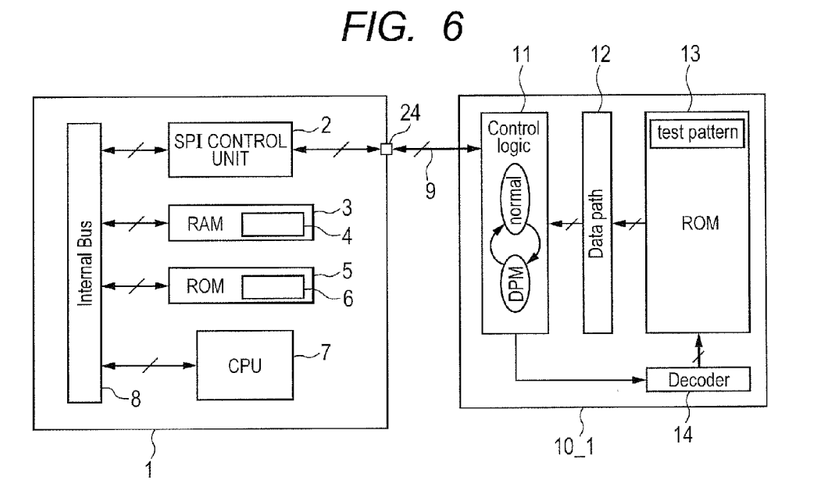
FIG. 6 is a block diagram showing the configuration of a controller LSI according to the fifth embodiment.

FIG. 6 is a block diagram showing the configuration of a controller LSI according to the fifth embodiment. Similar to the embodiments shown in FIGS. 2, 3, and 5, a controller LSI 1 and a flash memory 10_1 are interconnected. The controller LSI 1 is different from the controller LSI 1 shown in FIGS. 3 and 5 in that it does not include the boot controller 15. The controller LSI 1 can include the boot controller 15, but specifying the DPM support and the number of issues of the RES command is not necessary. Therefore, the controller LSI 1 of the fifth embodiment is configured in the same manner as the controller LSI 1 shown in FIG. 2. On the other hand, the flash memory 10_1 is different from the flash memory 10_1 of the embodiments shown in FIGS. 2, 3, and 5 in that predetermined test pattern data is stored at a predetermined address. The predetermined address can be located inside or outside the ROM mat 13. The configuration and action of the other elements are the same as those of the second embodiment already shown in FIG. 2, and therefore their explanations are omitted.

Upon returning from low power consumption mode, the controller LSI 1 causes the SPI control unit 2 to transmit a release command (RES command) and then repeatedly issues a read command that is a request to read data from a predetermined address in the flash memory 10_1. The controller LSI 1 waits until the response to the read command matches the predetermined test pattern and then starts issuing regular commands other than the RES command.

Even if the time required for the flash memory 10_1 to be released from the power down mode varies according to the types and specifications of the flash memory 10_1, the waiting time for release is automatically adjusted to an appropriate length of time. Especially, when the flash memory 10_1 is a flash memory having a deep power down mode and the time required for the flash memory 10_1 to be released from the deep power down mode varies according to the types and specifications of the flash memory 10_1, the controller LSI 1 can properly release the flash memory 10_1 from the deep power down mode. Furthermore, even if the time required for the flash memory 10_1 to be released from the deep power down mode is not clear or unstable, the controller LSI 1 can resume regular operations after verifying that the peripheral device has been definitely released from the deep power down mode.

The test pattern can be set as desired. However, caution has to be exercised to the test pattern setting so as not to coincidentally match with an expected pattern while the flash memory 10_1 is not released from the deep power down mode.

Sixth Embodiment
<Register Configuring Command Code of RES Command>

The conventionally used command code of the RES command for the SPI NOR-flash ROM is AB in hexadecimal notation; however, this is not especially authorized, but just a standard practice in the industry, and therefore the possibility that there already exist or will exist in the future peripheral devices 10 using RES commands containing different types of command codes cannot be denied.

Figure 7:
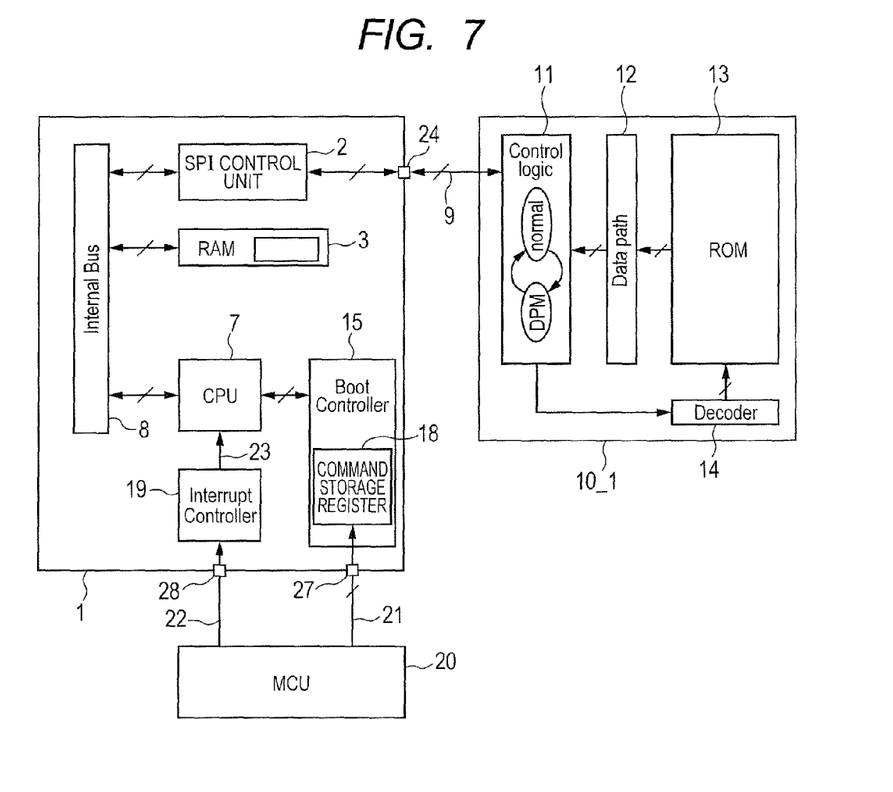
FIG. 7 is a block diagram showing the configuration of a controller LSI according to the sixth embodiment.

FIG. 7 is a block diagram showing the configuration of a controller LSI according to the sixth embodiment. The controller LSI 1 of the sixth embodiment can change the command code assigned to release (RES) commands. In comparison with FIG. 2, the flash memory 10_1 includes the same components, but the controller LSI 1 further includes a boot controller 15 and an interrupt controller 19, but not the ROM 5. There is no problem to form the controller LSI 1 with the ROM 5. In this case, the command code of the RES command is configured to be changeable in the boot program 6 stored in the ROM 5. The boot controller 15 includes a command storage register 18 that is configured to be writable by an externally connected MCU 20 through an MCU communication line 21 with an MCU communication terminal 27. The MCU communication terminal 27 can be, for example, a GPIO (General Purpose Input/Output) terminal. The externally connected MCU 20 outputs an external interrupt (Irq) signal 22 that reaches the interrupt controller 19 via an external interrupt (Irq) terminal 28 and then propagates to the CPU 7 as a CPU interrupt 23. The interrupt controller 19 that receives interrupts of other types of requests (not shown) performs arbitration on the interrupts using a mask set in the interrupt controller 19 or according to the priority of the interrupts to output a resultant interrupt as a CPU interrupt 23. The configuration and action of the other elements are the same as those of the second embodiment already shown in FIG. 2, and therefore their explanations are omitted.

Next, the boot sequence of the sixth embodiment will be described in detail.

Figure 8:
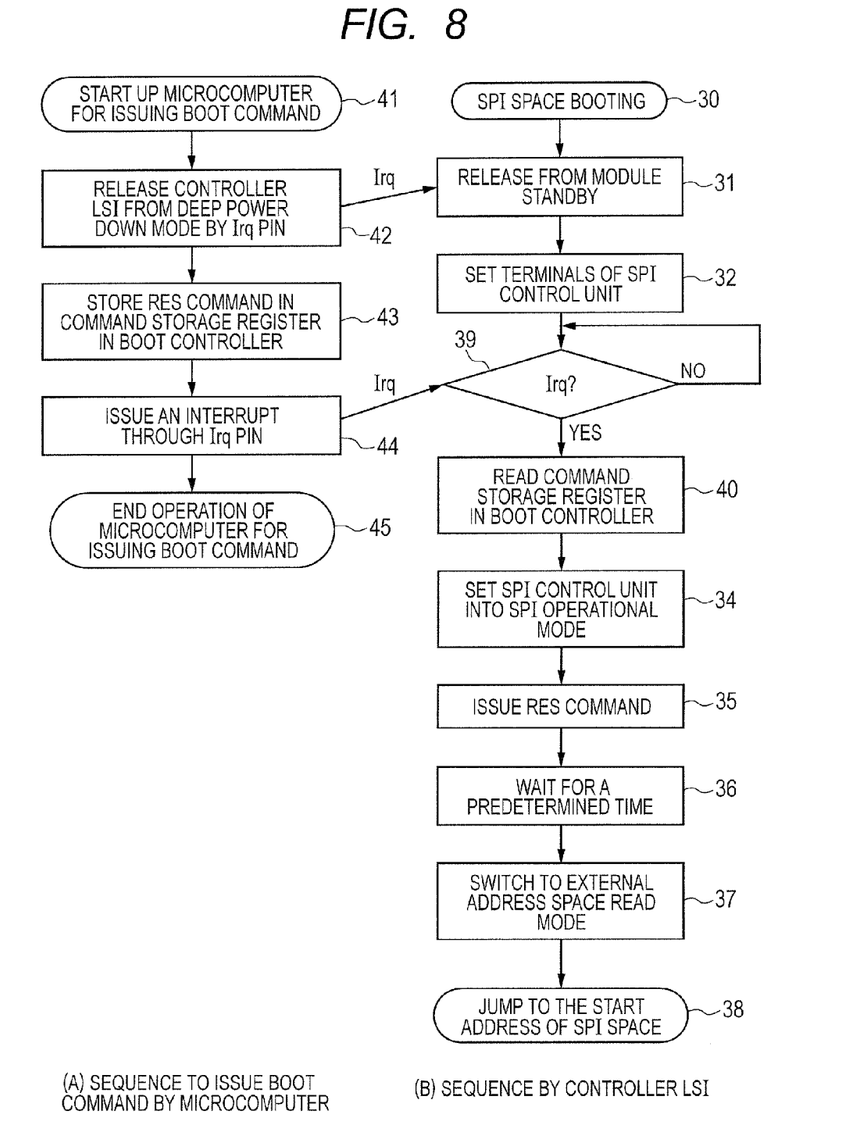
FIG. 8 is a flowchart showing operations of the controller LSI according to the sixth embodiment.

FIG. 8 is a flowchart showing operations of the controller LSI 1 according to the sixth embodiment. The operations of the externally connected MCU 20 are also described. (A) indicates a sequence performed by a microcomputer to issue a boot command and includes operations of the externally connected MCU 20. (B) indicates an operational sequence performed by the controller LSI 1. As shown in (A), when the MCU 20, which is a microcomputer used to issue a boot command, is started (step 41), the controller LSI 1 is released from low power consumption mode to normal mode in response to an external interrupt (Irq) 22 (step 42). In the case where the entire controller LSI 1 is in deep power down mode, the external interrupt (Irq) 22, a reset signal (not shown), or an NMI (Non-Maskable Interrupt) can be used to bring the controller LSI 1 into normal mode. Then, the MCU 20 writes a command code of a RES command into the command storage register 18 in the boot controller 15 of the controller LSI 1 (step 43). The MCU 20 issues an external interrupt (Irq) 22 to inform that writing to the command storage register 18 has been completed to the controller LSI 1 (step 44), thereby completing the operations (step 45). As shown in (B), upon starting SPI space booting (step 30), the controller LSI 1 firstly waits for the external interrupt (Irq) 22 issued by the MCU 20 in step 42, releases itself entirely from deep power down mode to normal mode (step 31), and sets the terminals of the SPI control unit 2 (step 32). If the SPI control unit 2 is partially in a module standby state, the controller LSI 1 releases the SPI control unit 2 from the module standby state instep 31. Then, the controller LSI 1 waits for the external interrupt (Irq) 22 issued in step 44 to inform that the MCU 20 has written the command code of the RES command in step 43 (step 39), and then reads data stored in the command storage register 18 in the boot controller 15 (step 40). Subsequently, the controller LSI 1 sets the SPI control unit 2 to SPI operation mode (step 34) to issue a release command (RES command) using the read command code (step 35). After the issue of the RES command, the controller LSI 1 executes WAIT for a predetermined period of time (step 36). Then, the controller LSI 1 is switched to external address space read mode (step 37) and jumps to the start address of the SPI space (step 38) to start loading the program 4 to the RAM 3.

Even if the command code assigned to the release command for the peripheral device 10 is not a specific code, the LSI can freely change the command code to obtain an adaptable code. For example, the conventionally used command code of the RES command for the SPI NOR-flash ROM at present is AB in hexadecimal notation. Even if the hexadecimal digits are changed, the LSI can obtain an adaptable code by appropriately changing the digits.

It should be further understood by those skilled in the art that although the foregoing description has been made on embodiments of the invention, the invention is not limited thereto and various changes and modifications may be made without departing from the spirit of the invention and the scope of the appended claims.

For instance, the CPU 7 may be any types of processors capable of executing programs and can be replaced with processors of other architectures. In addition, the controller LSI may include modules of other functions and may include a plurality of RAMs 3, ROMs 5 and other components.

What is claimed is:

1. A large scale integrated circuit (LSI) connectable to a peripheral device that enters power down mode in response to a power down command, is released from the power down mode to normal mode in response to a release command, and when being in the power down mode, is maintained in the power down mode even if it receives any commands other than the release command, the LSI comprising:
   a CPU;
   a volatile memory that stores intermediate data of the peripheral device and is accessible from the CPU, the intermediate data including data indicating that the peripheral device is in the power down mode; and
   a control unit that transmits commands including the power down command and the release command to the peripheral device,
   wherein the LSI has a plurality of operation modes including a low power consumption mode that volatilizes the intermediate data stored in the volatile memory, and
   the LSI causes the control unit to transmit the release command to the peripheral device when the LSI is released from the low power consumption mode.

2. The LSI according to claim 1 further comprising:
   a boot controller that can execute a boot sequence,
   wherein with execution of the boot sequence by the boot controller, a program executable by the CPU is loaded from the peripheral device to the volatile memory, and
   the boot sequence is configured to transmit the release command from the control unit to the peripheral device before the program is loaded.

3. The LSI according to claim 2,
   wherein the peripheral device is a flash memory having a deep power down mode, and the LSI further comprising:
   a serial communication terminal in conformity with SPI communication standards that is used to transmit the commands, including the power down command and the release command, from the control unit to the peripheral device.

4. The LSI according to claim 2,
   wherein the LSI selects whether to cause the control unit to transmit the release command to the peripheral device before loading the program or to load the program without transmission of the release command in the boot sequence.

5. The LSI according to claim 1,
   wherein after the LSI returns from the low power consumption mode and then causes the control unit to transmit the release command to the peripheral device, the LSI waits for a predetermined period of time and then starts issuing regular commands other than the release command.

6. The LSI according to claim 1,
   wherein after the LSI returns from the low power consumption mode and then causes the control unit to transmit the release command to the peripheral device a plurality of times, the LSI starts issuing regular commands other than the release command.

7. The LSI according to claim 6, further comprising:
   a terminal that specifies the number of the release commands to be transmitted from the control unit to the peripheral device when the LSI is released from the low power consumption mode.

8. The LSI according to claim 1,
   wherein after the LSI returns from the low power consumption mode and then causes the control unit to transmit the release command to the peripheral device, the LSI issues a read command that is a request to read predetermined data from the peripheral device, waits until the response to the read command matches a predetermined expectation value, and starts issuing regular commands other than the release command.

9. The LSI according to claim 8,
   wherein the peripheral device is a flash memory having a deep power down mode,
   the flash memory stores predetermined test pattern data at a predetermined address,
   the read command is a command to read data at the address, and
   the LSI waits until the response to the read command matches the test pattern and then starts issuing regular commands other than the release command.

10. The LSI according to claim 1,
    wherein the LSI is capable of changing command codes to be assigned to the release command.

11. The LSI according to claim 10, further comprising:
    an externally-rewritable register that can hold the command codes.

12. An information processing system comprising:
    a peripheral device that enters power down mode in response to a power down command, is released from the power down mode to normal mode in response to a release command, and when being in the power down mode, is maintained in the power down mode even if it receives any commands other than the release command; and
    a large scale integrated circuit (LSI) that is connected to the peripheral device and includes a CPU, a volatile memory accessible from the CPU, and a control unit that transmits commands including a power down command and a release command to the peripheral device,
    wherein the volatile memory stores intermediate data of the peripheral device, the intermediate data including data indicating that the peripheral device is in the power down mode and
    the LSI has a plurality of operation modes including a low power consumption mode that volatilizes the intermediate data stored in the volatile memory and causes the control unit to transmit the release command to the peripheral device when the LSI is released from the low power consumption mode.

13. The information processing system according to claim 12, wherein the peripheral device stores a program to be executed by the CPU,
    the LSI further includes a boot controller that can execute a boot sequence, and with execution of the boot sequence by the boot controller, the program executable by the CPU is loaded from the peripheral device to the volatile memory, and
    the boot sequence is configured to transmit the release command from the control unit to the peripheral device before the program is loaded.

14. The information processing system according to claim 13, wherein the peripheral device is a flash memory having a deep power down mode, and
    the peripheral device and the LSI are interconnected with a serial communication channel in conformity with SPI communication standards.

15. The information processing system according to claim 14, wherein the flash memory stores predetermined test pattern data at a predetermined address, and after the LSI returns from the low power consumption mode and then causes the control unit to transmit the release command to the peripheral device, the LSI issues a read command that is a request to read data at the predetermined address of the peripheral device, waits until the response to the read command matches the test pattern, and then starts issuing regular commands other than the release command.

16. The information processing system according to claim 12, wherein the LSI is capable of changing command codes to be assigned to the release command.

17. The information processing system according to claim 16, further comprising:

an MCU, wherein the LSI includes an externally-rewritable release-command-code configuring register that can hold the command codes, the MCU supplies interrupt signals to release the LSI from the low power consumption mode, and the release-command-code configuring register is rewritable.

* * * * *